United States Patent
O'Doherty

(10) Patent No.: US 12,504,894 B2
(45) Date of Patent: Dec. 23, 2025

(54) METHODS AND SYSTEMS FOR SECURE DATA STORAGE

(71) Applicant: NCIPHER SECURITY LIMITED, Cambridge (GB)

(72) Inventor: David O'Doherty, Cambridge (GB)

(73) Assignee: nCipher Security Limited, Cambridge (GB)

( * ) Notice: Subject to any disclaimer, the term of this patent is extended or adjusted under 35 U.S.C. 154(b) by 60 days.

(21) Appl. No.: 18/705,348

(22) PCT Filed: Oct. 27, 2022

(86) PCT No.: PCT/GB2022/052727
§ 371 (c)(1),
(2) Date: Apr. 26, 2024

(87) PCT Pub. No.: WO2023/073368
PCT Pub. Date: May 4, 2023

(65) Prior Publication Data
US 2025/0004649 A1    Jan. 2, 2025

(30) Foreign Application Priority Data
Oct. 27, 2021    (EP) .................................... 21275153

(51) Int. Cl.
*G06F 3/06* (2006.01)
(52) U.S. Cl.
CPC .......... *G06F 3/0622* (2013.01); *G06F 3/0655* (2013.01); *G06F 3/0679* (2013.01)

(58) Field of Classification Search
CPC ............. G06F 2221/2107; G06F 21/78; G06F 3/0622; G06F 21/62; G06F 3/0653; G06F 3/062; H04L 9/0822
See application file for complete search history.

(56) References Cited

U.S. PATENT DOCUMENTS

| | | | |
|---|---|---|---|
| 2007/0266258 A1* | 11/2007 | Brown | H04L 63/00 713/183 |
| 2013/0121488 A1* | 5/2013 | Kang | G06F 21/78 380/44 |
| 2014/0250303 A1* | 9/2014 | Miller | G06F 21/602 713/171 |

(Continued)

OTHER PUBLICATIONS

International Search Report and Written Opinion received for PCT Serial No. PCT/GB2022/052727 on Jan. 18, 2023, 10 pgs.

(Continued)

*Primary Examiner* — Hitesh Patel

(57) ABSTRACT

A computer-implemented method of storing data from a second storage component in a first storage component includes: storing information relating to a first sequence of values in the first storage component; storing a second sequence of values from the second storage component into the first storage component in a plurality of steps, deleting or overwriting one or more values from the second sequence of values which were stored in the first storage component in a previous step; and storing an encrypted third sequence of values in the first storage component. The third sequence of values is derivable from the first sequence of values and the second sequence of values.

10 Claims, 7 Drawing Sheets

(56) References Cited

U.S. PATENT DOCUMENTS

2017/0230179 A1    8/2017  Mannan

OTHER PUBLICATIONS

International Preliminary Report on Patentability received for PCT Serial No. PCT/GB2022/052727 on May 10, 2024, 8 pgs.
European Search Report received for EP Application No. EP21275153 on Apr. 21, 2022, 7 pgs.
Skorobogatov, "Data Remanence in Flash Memory Devices", University of Cambridge.
International Search Report and Written Opinion received for PCT Serial No. PCT/GB2022/052727 on Jan. 18, 2023, 13 pgs.

\* cited by examiner

METHODS AND SYSTEMS FOR SECURE DATA STORAGE

CROSS-REFERENCE TO RELATED APPLICATIONS

The present application is a National Stage Filing of PCT International Application No. PCT/GB2022/052727 filed on Oct. 27, 2022, which claims priority to European application No. 21275153.1, filed with the European Patent Office on Oct. 27, 2021, which applications are incorporated herein by reference in their entirety.

TECHNICAL FIELD

The present disclosure relates to methods and systems for secure data storage. In particular, the present disclosure relates to methods of loading secret material from a long-term storage component into main memory, methods of storing secret material in long-term storage, and methods of managing storage of secret material in main memory.

BACKGROUND

A hardware security module (HSM) is a device that securely stores and manages cryptographic keys, and performs a set of cryptographic functions. An HSM comprises various components which store secret material. In particular, an HSM may comprise a long-term storage component and a main memory component. Secret material is stored in the long-term storage component and loaded into the main memory component for use.

Various types of computer memory which are used in an HSM may, under certain circumstances, retain previously stored information. For example, previously stored information may be recovered from long-term storage even after it has been overwritten or erased. Previously stored information may be recovered from main memory even after power has been removed. These effects are referred to as data remanence. A security weakness may therefore be introduced, whereby a malicious party could obtain previously stored cryptographic material based on data remanence of a storage component within an HSM device.

BRIEF DESCRIPTION OF THE DRAWINGS

Devices and methods in accordance with non-limiting embodiments will now be described with reference to the accompanying figures in which.

DETAILED DESCRIPTION

Figure 1:
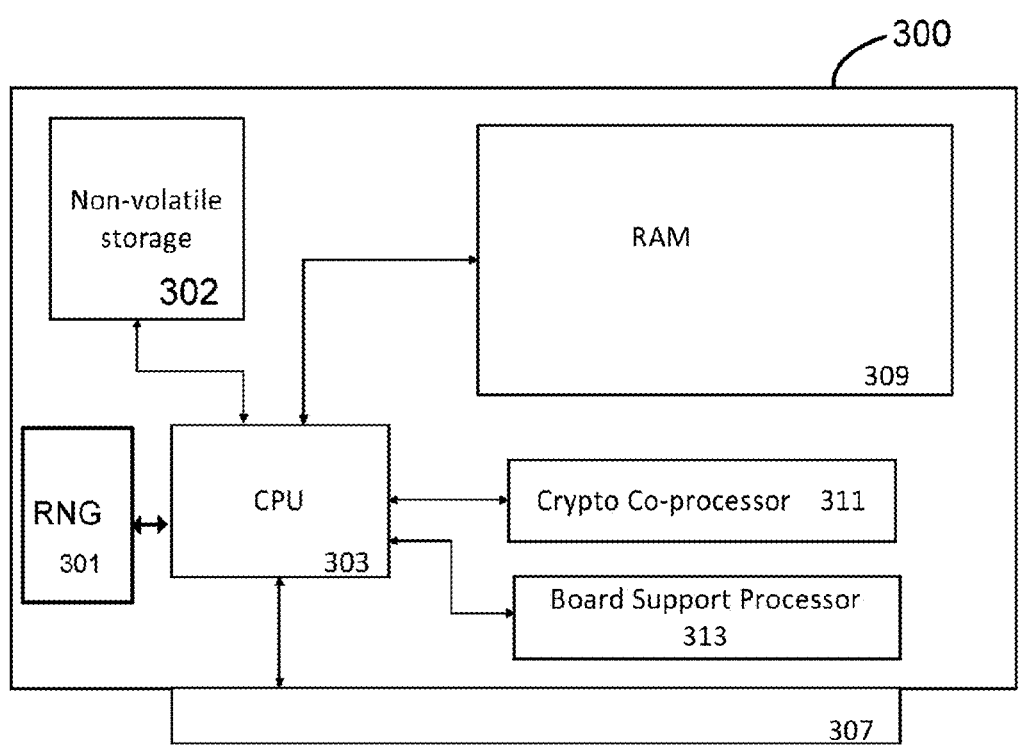
FIG. 1 is a schematic illustration of device in accordance with an embodiment.

In a first aspect, there is provided a computer-implemented method of storing data from a second storage component in a first storage component, the method comprising:
storing information relating to a first sequence of values in the first storage component;
storing a second sequence of values from the second storage component into the first storage component in a plurality of steps, deleting or overwriting one or more values from the second sequence of values which were stored in the first storage component in a previous step;
storing an encrypted third sequence of values in the first storage component, wherein the third sequence of values is derivable from the first sequence of values and the second sequence of values.

The third sequence of values corresponds to secret material. Security of the secret material when loaded from the second storage component to the first storage component is provided. The first storage component may be main memory (for example RAM) of a device and the second storage component may be long-term storage of the device. The method mitigates against remanence effects in the first storage component, and provides protection against malicious attacks that exploit remanence in the first storage component. The second sequence is read to the first storage component in a plurality of steps, where a part of the second sequence read into the first storage component in a previous step is deleted or overwritten in the current step. In this way, the complete second sequence is not stored in the first storage component at one time.

In an embodiment, the values from the second sequence of values are read into the first storage component in a random order. Information as to the order of the values in the second sequence is not available in the first storage component. Any remanence of the first storage component may yield the number of values in the second sequence and the values themselves. However, the order of the second sequence, and therefore the third sequence, is not derivable, and possible recovery of secret material is mitigated.

In an embodiment, the third sequence is a unique combination of the first and second sequences. For example, the third sequence is uniquely defined by selecting each value of the second sequence in an order defined by the values of the first sequence. In an embodiment, for each of the plurality of steps, a value from the second sequence of values is read from the second storage component into the first storage component according to the random order, and an encrypted version of the value is written to the first storage component in a position of a portion of memory in the first storage component to be used to store the third sequence of values, the position being determined according to the first sequence of values.

In an embodiment, storing information relating to the first sequence of values comprises reading a first encrypted version of the first sequence of values from the second storage component, and writing a second encrypted version of the first sequence of values to the first storage component. For example, the first sequence is not stored in plaintext in the first storage component, but the first encrypted version of the first sequence of values read from the second storage component is transformed directly to the second encrypted version of the first sequence. For example, prior to storing the encrypted version of the first sequence of values, an encryption sequence is stored in a respective portion of memory of the first storage component to be used to store the second encrypted version of the first sequence. In an embodiment, information for decrypting the second encrypted version of the first sequence is stored in the first storage component.

In an embodiment, the method further comprises repeatedly re-encrypting the third sequence of values with a further encryption sequence at pre-determined time intervals. For example, the pre-determined time interval is around every 5 minutes, or every 10 minutes. Storing each encrypted sequence for lower storage times reduces the likelihood that the data is recoverable after erasure due to remanence effects in the first storage component. The encryption may be performed using one-time-pad based encryption for example.

In an embodiment, each step comprises reading a group of memory cells in the second storage component comprising a portion of the second sequence of values. For example, the group of memory cells comprises at most one value of the second sequence. The group of memory cells comprises an amount of memory that can be read simultaneously.

In an embodiment, prior to storing the encrypted version of the third sequence of values, an encryption sequence is stored in a respective portion of memory of the first storage component to be used to store the encrypted version of the third sequence.

In an embodiment, the method further comprises decrypting the third sequence of values and using the third sequence of values for a cryptographic operation. For example, the third sequence is an ordering of the integer values from 0 to B, where B is a positive integer. This sequence may be used as a root cryptographic key, to derive a further cryptographic key or to encrypt and decrypt a further cryptographic key.

In an embodiment, the encrypted third sequence is used directly in a cryptographic algorithm. For example, the encrypted third sequence may be used in a cryptographic algorithm that can operate on an OTP-encrypted key rather than the original key in the plain, meaning that the key in the plain is not stored in main memory as an intermediate stage.

According to another aspect, there is provided a device, comprising:
 a first storage component;
 a second storage component; and
 one or more processors, the one or more processors configured to:
  store information relating to a first sequence of values in the first 5 storage component;
  store a second sequence of values from the second storage component into the first storage component in a plurality of steps, deleting or overwriting one or more values from the second sequence of values which were stored in the first storage component in a previous step;
  store an encrypted third sequence of values in the first storage component, wherein the third sequence of values is derivable from the first sequence of values and the second sequence of values.

The device may be a hardware security module. The second storage component may be a non-volatile storage component of the hardware security module device and the first storage component may be a main memory component of the hardware security module device. The first storage component may be random-access memory (RAM), such as dynamic RAM (DRAM). The second storage component may be a flash storage component.

According to another aspect, there is provided a method for storing data in a storage component, the method comprising:

storing an encrypted version of a first sequence of values in the storage component;
 storing a second sequence of values across a set of non-contiguous memory cells in the storage component, wherein the data comprises a third sequence of values which is derivable from the first sequence of values and the second sequence of values.

Secret material, comprising the third sequence of values, is to be stored in the storage component. The secret material is stored as a first sequence of values and a second sequence of values, where the third sequence of values (the data) is derivable from the first sequence of values and the second sequence of values. The first sequence of values is stored in the storage component in an encrypted manner Security of the secret material is therefore provided. The storage component may be long-term storage of a device. The method mitigates against remanence effects in the storage component, and provides protection against malicious attacks that exploit remanence in the storage component.

The first set of memory cells comprises a plurality of contiguous groups of memory cells. One portion of the second sequence of values is stored in each group. Each group of memory cells comprises an amount of memory that can be read simultaneously. This means that the second sequence is read from the storage component one group at a time. For example, the group of memory cells comprises at most one value of the second sequence. In an embodiment, the remaining memory cells in each group are programmed with a constant value.

The method may further comprise obtaining and storing a first set of one or more encryption sequences, wherein storing the encrypted version of the first sequence comprises encrypting the first sequence with the first set of one or more encryption sequences. The first and second sequences may comprise randomly ordered values.

In an embodiment, the method further comprises pre-conditioning the storage component, comprising writing the set of memory cells with a plurality of cycles of data. In an embodiment, the pre-conditioning comprises formatting the storage component device prior to a first use or further use. In an embodiment, the formatting comprises programming the set of memory cells at least once with one or more of: all ones, all zeros, arbitrary data. This pre-conditioning may be performed in order to reduce remanence effects in fresh memory cells.

In a further aspect, there is provided a device, comprising:
 a storage component; and
 one or more processors, the one or more processors configured to:
  store an encrypted version of a first sequence of values in the storage component;
  store a second sequence of values across a set of non-contiguous memory cells in the storage component, wherein a third sequence of values is derivable from the first sequence of values and the second sequence of values.

In a further aspect, there is provided a method for managing stored data, the method comprising:
 storing a first encrypted version of a sequence of values on a first storage component;
 repeatedly, at pre-determined time intervals, re-encrypting the sequence of values to store a re-encrypted sequence.

In a further aspect, there is provided a device, comprising:
 a first storage component; and
 one or more processors, the one or more processors configured to:

store a first encrypted version of a sequence of values;
repeatedly, at pre-determined time intervals, re-encrypt the sequence of values to store a re-encrypted sequence.

In a further aspect, there is provided a method for storing data in a storage component, the method comprising:
determining a maximum recovery rate of data erased from the storage component;
generating information for encrypting the data with a pre-determined level of security given the determined maximum recovery rate; and
storing an encrypted version of the data in the storage component using the generated information.

In an embodiment, the information for encrypting the data comprises one or more one-time pads, and the information is generated comprising a sufficient number of one-time pads to encrypt the data with the pre-determined level of security.

According to a further aspect, there is provided a device, comprising:
a storage component; and
one or more processors, the one or more processors configured to:
determine a maximum recovery rate of data erased from the storage component;
generate information for encrypting the data with a pre-determined level of security given the determined maximum recovery rate; and
store an encrypted version of the data in the storage component using the generated information.

In a further aspect, there is provided a carrier medium comprising computer readable code configured to cause a computer to perform any of the above methods.

In a further aspect, there is provided a non-transitory computer readable storage medium comprising program instructions stored thereon that are executable by a computer processor to perform any of the above methods.

The methods are computer-implemented methods. Since some methods in accordance with embodiments can be implemented by software, some embodiments encompass computer code provided to a general-purpose computer on any suitable carrier medium. The carrier medium can comprise any storage medium such as a CD ROM, a magnetic device or a programmable memory device, or any transient medium such as any signal, e.g. an electrical, optical or microwave signal. The carrier medium may comprise a non-transitory computer readable storage medium. In a further aspect of the present invention, there is provided a carrier medium comprising computer readable code configured to cause a computer to perform any of the methods described.

A hardware security module (HSM) is a device that securely stores and manages cryptographic keys, and performs a set of cryptographic functions. An HSM comprises various components which store secret material. In particular, an HSM may comprise a long-term storage component and a main memory component. Secret material is stored in the long-term storage component and loaded into the main memory component for use. For example, HSMs may store root cryptographic keys in the long-term storage component, which are used to encrypt other keys for storage outside of the HSM.

Various types of computer memory hardware used in such devices may, under certain circumstances, retain previously stored information. For example, previously stored information may be recovered from long-term storage even after it has been overwritten or erased. Previously stored information may be recovered from main memory even after power has been removed. These effects are referred to as data remanence. A security weakness may therefore be introduced, whereby a malicious party could obtain previously stored cryptographic material based on data remanence of a storage component within an HSM device.

For this reason, where secret material is to be stored for some period in a storage component of an HSM, it is desirable to mitigate remanence effects. For example, it may be desirable to reduce the ability to recover previously stored secret material in hardware storage components that have remanence issues in cases where it is either not possible to address the issues with the hardware, for example where it is not technically possible, or where it is not possible to modify existing deployed hardware. It may also be desirable to reduce the ability to recover previously stored secret material in hardware storage components that have remanence issues in cases where hardware changes would be expensive or impractical to deploy. The present disclosure relates to methods that may be implemented in software to mitigate security risks arising as a result of possible remanence attacks.

The main memory of the HSM may comprise dynamic random-access memory (DRAM), in which memory cells comprise a capacitor and a transistor. DRAM is a volatile type of memory, in which the stored data is lost once power is removed. Data may still be readable several seconds or minutes after power is removed however. This data remanence means that an attacker with physical access to the HSM could retrieve data from main memory during this period. For some main memory components, data may still be readable for a longer period if the component is cooled. Cooling can allow data to be recovered from DRAM several hours or days after removal of power. This is referred to as a cold boot attack.

In an HSM device, secret material may be loaded from the long-term storage to the main memory during a boot sequence, each time the HSM is powered on. For example, root cryptographic keys stored in long-term storage may be loaded into the main memory when the HSM is powered on. This secret material should be lost from main memory when power is removed, however data may still be readable for some period after power is removed as explained above A malicious party having physical access to the HSM may exploit this remanence in the main memory of the HSM. Furthermore, where a malicious party attempts to physically access an HSM, an active tamper mechanism may cause an erasure operation of the long-term storage.

However, secret material that was loaded into main memory of the HSM may not be erased by such active tamper mechanisms. The below described methods mitigate against such attacks, using techniques implemented in software, which can be implemented on an existing HSM device for example.

In various types of non-volatile, or long-term, storage components, data may be stored as charge. For example, Flash memory device memory cells comprise floating gate transistors. In such devices, after an erase operation, a memory cell may not fully return to an initial state. Previously stored information can therefore be recovered even after it has been erased. In a Flash storage device, data may be stored in a memory cell by charging the floating gate, which increases the threshold voltage of the cell. Various processes used to write data to the memory cell may be destructive to the dielectric insulation layer isolating the floating gate. Repeated cycles of writing or erasing a cell may cause a gradual change to the threshold voltage and programming time of the memory cell. Such changes are particularly apparent in freshly programmed cells. It may be possible to differentiate between a fresh cell and a programmed-and-erased cell for example. Other types of long-term storage may also exhibit data remanence effects, for example long-term storage components in which data is stored on magnetic media.

In an HSM device, secret material is stored in the long-term storage, for example, root cryptographic keys are stored in long-term storage. A malicious party having physical access to the HSM may exploit remanence in the long-term memory of the HSM to retrieve previously erased secret material. A malicious party may gain physical access to an HSM device after it is decommissioned for example. When decommissioned, contents of the HSM are erased and then the HSM is disposed of in some manner. In such cases, a malicious party may obtain the decommissioned HSM and exploit remanence in the long-term memory of the HSM to retrieve the erased secret material. Furthermore, as explained above, HSM devices may include some active tamper mechanism, that causes an erasure operation to occur in the long-term storage when tamper is detected A malicious party may gain physical access to the HSM, but trigger the active tamper mechanism when attempting access. In such cases, a malicious party may again exploit remanence in the long-term memory of the HSM to retrieve the secret material that was erased by the active tamper mechanism. The below described methods also mitigate against such attacks, using techniques implemented in software, which can be implemented on an existing HSM device for example. The methods can be implemented for systems where it is not possible or not practical address such remanence issues with hardware for example, or where there is a mixture of hardware that has remanence mitigation features and hardware which does not have remanence mitigation features, where secret material is stored in the latter hardware at least some of the time.

FIG. 1 is a schematic illustration of a hardware security module (HSM) 300 device according to an embodiment. An HSM is a device that securely stores and manages cryptographic keys, and performs a set of cryptographic functions. An HSM may comprise both physical and non-physical properties that provide security Non-physical security properties can include the use of encryption, i.e. the inclusion in the device of software or a physical component to perform encryption of the stored data. Physical security properties can include tamper detection mechanisms, such as tamper switches triggered by physical access that cause an erasure operation to occur.

The HSM 300 comprises a central processing unit (CPU) 303. The CPU 303 is in wired bi-directional communication with non-volatile, or persistent, storage component 302. This component is also referred to as the long-term storage component 302. The long-term storage component 302 stores cryptographic keys, as well as computer program code. The non-volatile storage 302 may comprise any form of non-volatile device memory such as flash, optical disks or magnetic hard drives for example. The long-term storage component 302 is also referred to here as the second storage component.

The CPU 303 is also in wired bi-directional communication with main memory or RAM 309. The CPU 303 also comprises its own memory registers (not shown). The RAM 309 and CPU registers are operating or working memory of the CPU 303. Computer program code is loaded from the non-volatile memory 302 into RAM 309 for execution by the processor 303. The processor 303 may comprise logic circuitry that responds to and processes the instructions in code stored in the main memory 309. In particular, when executed, a program is represented as a software product, or process, stored in the main memory 309. The main memory 309 is also referred to here as a first storage component.

The programs may be referred to as "firmware" in this description, however generally the programs comprise a set of computer instructions stored in the non-volatile memory 302 and embodying the functionality as will be described in relation to the methods below. The computer instructions, or firmware, may be written in any of a number of programming languages, and may be stored on the HSM device 300 as compiled code. The firmware comprises computer instructions embodying one or more of the methods as described herein. The firmware may further comprise computer instructions embodying one or more of the following cryptographic functions for example: cryptographic key generation; key derivation; encryption; decryption; and digital signature functions (for example digital signing or validation of a digital signature). The firmware can be embedded in the HSM 300 when manufactured, or can be provided, as a whole or in part, after manufacture. For instance, the firmware can be introduced as a computer program product, which may be in the form of a download. Alternatively, modifications to existing firmware can be made by an update, or plug-in.

The processor 303 runs an operating system, for example a Linux operating system. However, it is understood that the processor 303 could run other operating systems, such as Windows. The Linux operating system comprises system software that manages the hardware and software resources of the HSM device 300, and acts as an intermediary between the firmware (and any other applications) and the HSM hardware.

The HSM 300 may be communicatively coupled to a computer or server device in a host system (not shown) through interface 307, which comprises a communication link. For example, it may comprise a USB connector, or the HSM device 300 can be a PCI express card directly plugged into the computer or server device. The host system might be a client system, or might be a service provider system for example. In some cases, although the majority of the implementation is provided in the firmware of the HSM 300, some supporting code might be provided in software running on a client system or on a web server, for example where additional protection with client keys is implemented.

The HSM device 300 further comprises a random number generator (RNG) 301. Although in FIG. 1, the RNG 301 is shown separately to the other components, in some examples it may be located on the same chip as another component, for example it may be located on the same chip as the crypto co-processor 311. Furthermore, although in FIG. 1, the RNG 301 is shown as a single component, in some cases there may be several RNGs. For example, the HSM device 300 may comprise a hardware (or "true") RNG, a deterministic RNG which is seeded with entropy from the hardware RNG, and a further RNG in the crypto co-processor 311. For example, the HSM device 300 may comprise a Texas Instruments MSP430 microcontroller which includes a hardware RNG. The HSM device 300 may further include an NXP T1022 chip which includes a deterministic RNG.

The HSM device 300 may comprise further components, such as a board support processor 313. Board support processor 313 is configured to communicate with a plurality of on-board sensors, monitoring the operation of the main CPU 303 and the other hardware components of the hardware security module 300. The sensors may include but are not limited to CPU and/or board temperature sensors, voltage and/or current sensors.

In this example, the HSM device 300 further comprises a crypto co-processor 311, which is configured to perform certain cryptographic functions instead of the CPU 303. The crypto co-processor 311 may be an NXP C291 for example.

Although an example is described here of various components of an example HSM device, it is to be understood that an HSM device may not comprise all of the components described herein, or may comprise different or additional components. For example, the HSM device may be implemented using an ASIC or a Field Programmable Gate Array (FPGA).

Application cryptographic keys associated with a client are used to perform one or more cryptographic functions embodied in the firmware on the HSM 300. In order to perform one of the cryptographic functions, the relevant application key is retrieved and loaded into the RAM space of the firmware process in the RAM 309. This may happen when a client request in the form of a command is received at the HSM 300, or each time the HSM 300 is powered on for example.

The application key may be stored in the long-term storage 302 of the HSM 300. In this case, the application key is retrieved from the long-term storage component 302 to the RAM 309, and then used to perform the requested cryptographic function.

Alternatively, the application key is stored in an encrypted manner in a storage component which is external to the HSM 300. In this scenario, a root cryptographic key is stored in the long-term storage 302 of the HSM 300. A root cryptographic key is also referred to here as a long-term key. An application key is encrypted with the root key and stored on an external storage component. The external storage component may be a storage component on a client device, or in a smart card connected to a client device. The HSM may be coupled directly to the client device, for example, it may comprise a USB connector, or the HSM device 300 can be a PCI express card directly plugged into the client computer. Alternatively, the client device communicates with a computer or server device in a host service provider system via a communication network such as the Internet, where the HSM device is then coupled to the computer or server device in the service provider system. The root key is loaded from the long-term storage component 302 to the RAM 309. The encrypted application key is sent to the HSM from the external storage component. The application key is then decrypted on the HSM device 300 using the root key. The application key is then used by the hardware security module 300 to perform one or more cryptographic operations. For example, a smartcard filesystem could be encrypted by a key that is derived at least in part from a root cryptographic key that is stored in the HSM. The decrypted contents of the smart card are then used only in the HSM.

In one example, portions of the application key are retrieved from separate storage components. The application key may be encrypted by the root key which is kept on the HSM device 300, and subsequently split across multiple smart cards using secret sharing schemes that allow a quorum of the cards to reconstruct the original application key, for example there may be 5 cards with portions of the application key, and any 3 have enough information to reconstruct the application key. The portion of application key information on each smart card is referred to as a "share".

As described above, an example of secret material that may be stored in a long-term storage component 302 of an HSM 300 is a root cryptographic key used to encrypt other application keys, or part of the seed material from which such a root cryptographic key is derived by a key derivation mechanism. When that secret material is erased from the long-term storage 302, the other application keys encrypted with the root key will no longer be usable either. The secret material might be erased from the HSM 300 prior to disposal of the HSM 300 or as part of an active tamper mechanism for example. However, if remanence issues in the long-term storage component 302 allow for recovery of that erased secret material, then the application keys that the root key protects will also become usable. A malicious party could exploit the remanence issues of the long-term storage component 302 to recover a root key from an HSM 300 that has been disposed of, and so be able to use the application keys. The below described methods provide protection of secret material after erasure from long-term storage 302.

Figure 2:
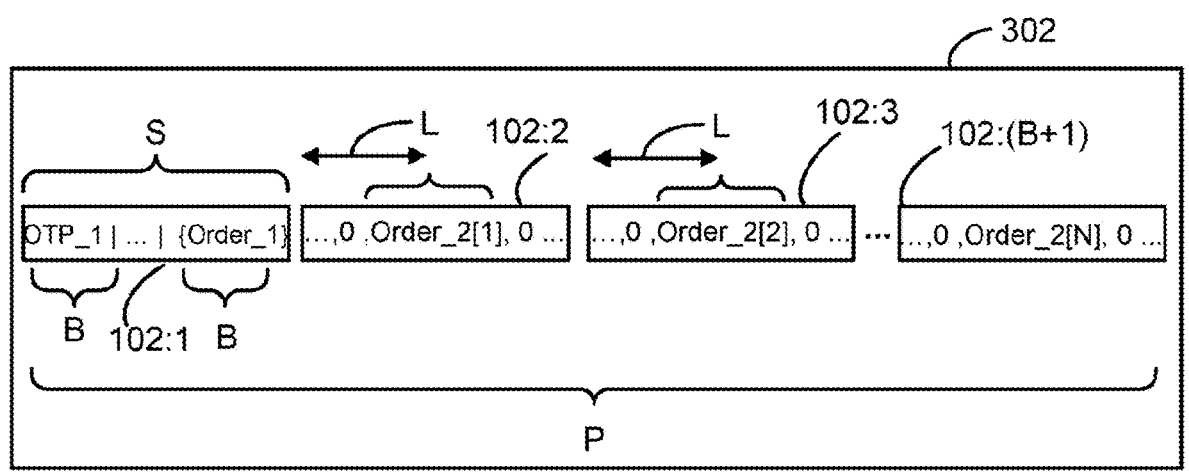
FIG. 2 is a schematic illustration of an arrangement for storing data in long-term memory of a device according to an embodiment.
Figure 3:
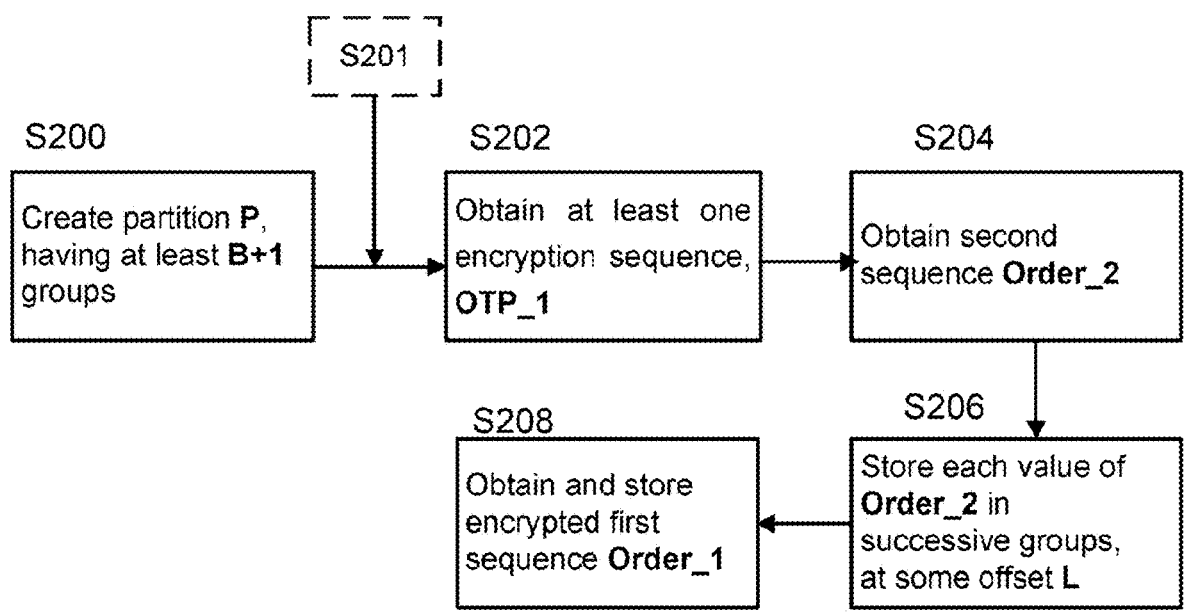
FIG. 3 is a flowchart showing a method of storing data in long-term memory according to an embodiment.

FIG. 3 shows a flow chart of a method of storing data in a long-term storage component, which reduces the ability of an attacker to recover secret material from the long-term storage component after erasure. FIG. 2 is a schematic illustration of the data stored in the long-term storage component using the method of FIG. 3. The method reduces the recoverability of erased material from long-term storage, even by an attacker with physical access to the device.

FIG. 2 shows an example arrangement of data stored in a long-term storage component 302 of a device according to an embodiment. In the example described here, the long-term storage component 302 is a long-term storage component 302 within an HSM device 300 such as described in relation to FIG. 1. However, in alternative examples, the long-term storage component may be a storage component on a smart card for example. In the example described here, the storage component 302 is Flash storage. However, as described above, remanence issues can impact other types of long-term storage components, such as magnetic storage media, and therefore the storage arrangement can be applied to other types of long-term storage component.

The data stored on the long-term storage component can be used to re-construct some secret material. The secret material may be, for example, a root cryptographic key used to encrypt other keys, a user-generated cryptographic key, or any other secret data. In the example described here, the data can be used to re-construct a root cryptographic key.

The portion of the storage component 302 shown comprises a memory partition, P, and a plurality of groups of memory 102. Each memory group 102 has size S. The partition, P, and memory groups 102 will be described in more detail in relation to FIG. 3 below.

A first memory group 102:1 comprises a first set of one or more encryption sequences and an encrypted first sequence. The first set of one or more encryption sequences comprises a first encryption sequence referred to as 'OTP_1' and may include further encryption sequences as described below. The first sequence is referred to as 'Order_1'. In this example, the first sequence Order_1 comprises B values. In this example, B=256. The remaining memory groups 102 each comprise one value of a second sequence, 'Order_2'. Order_2 also has length B values, where each value of Order_2 is located at offset L in each memory group 102. In this example, partition P as shown contains B+1 memory groups 102.

In this example, the first encryption sequence OTP_1 is a 'one-time-pad' (OTP), and is used to encrypt the first sequence Order_1. An encrypted version of Order_1 is stored in the first memory group 102:1, encrypted by at least OTP_1. In the example described here, multiple OTPs are stored in the first memory group 102:1, and are used to successively encrypt Order_1. In this way, the plaintext of Order_1 is never stored in the long-term storage component 302. For example, as many OTPs as will fit in the first memory group 102:1 are stored in the first memory group 102:1 and used to encrypt the first sequence Order_1.

A one-time-pad is a sequence of random data, which is used only once. However, it will be appreciated that alternative sequences or methods may be used in place of the first encryption sequence OTP_1 to encrypt Order_1. In this example, the first encryption sequence OTP_1 comprises random data of length 256 bytes. The first sequence Order_1 is a random ordering of the integers between 0 and 255 inclusive, with each value being stored using 1 byte. The second sequence Order_2 is also a random ordering of the integers between 0 and 255 inclusive, with each value being stored using 1 byte. Although in this example OTP_1 has the same length as Order_1, OTP_1 may be longer than Order_1 for example.

The root key information is also referred to here as a third sequence Order_3. The third sequence is the secret material. The third sequence can be derived from a unique combination of the first sequence Order_1 and the second sequence Order_2. In this example, the third sequence Order_3 is given by reading the values of the second sequence Order_2 in the order of the first sequence Order_1. The $i^{th}$ value of Order_3 is found by reading the $i^{th}$ value of the first sequence Order_1 (Order_1 (i)) and then taking the Order_1 $(i)^{th}$ value of the second sequence Order_2 (Order_2 (Order_1 (i))). The third sequence Order_3 is the secret material and is stored in such a manner so as to mitigate the risk of a remanence attack. In particular, the third sequence Order_3 is not stored in plaintext in the long-term storage 302, rather the first sequence Order_1 and the second sequence Order_2 are stored, with the first sequence Order_1 being encrypted. The storage arrangement of FIG. 2 therefore improves the security of storage of secret material (the third sequence Order_3) in the long-term storage 302. Furthermore, the storage arrangement improves the security when the secret material is read from partition P, as will be described below in relation to FIG. 4.

In this example, all other memory cells in the memory groups 102:2 to 102:(B+1) are written with a constant value, in this instance a zero. 'Ones' could also be used. Random material is not written to each of these memory groups, besides the value of Order_2 at offset L, so that differences in any of these values cannot be used to correlate orderings of memory groups when the values are later read into main memory 309. In some scenarios, and as will be discussed in more detail below, a main memory component 309 may exhibit remanence Where the values (besides byte L) in each memory group differ between the memory groups, there could be sufficient recovery of material from the main memory 302 that analysis might reveal the order in which the memory group data had been stored in the long-term storage component 302, which could allow an attacker to derive some or all of Order_3. Thus each cell of each of the memory groups 102:2 to 102:(B+1) is written with identical values, apart from the value at L, so that additional information is not leaked.

FIG. 3 illustrates an example method for storing data in a long-term storage component in accordance with an embodiment. The data is stored in the arrangement as described above in FIG. 2. Again, in the example described here, the long-term storage component is a long-term storage component 302 within an HSM device 300. However, in alternative examples, the long-term storage component may be a storage component on a smart card for example. In the example described here, the storage component 302 is Flash storage. However, as described above, remanence issues can impact other types of long-term storage components, such as magnetic storage media, and therefore the storage arrangement can be applied to other types of long-term storage components.

In S200, a memory partition P is created on the long-term storage component 302. The partition is a contiguous volume of memory in the long-term storage component 302. For example, the partition is a contiguous set of memory cells in the long-term storage component 302. The partition could be created during first-time initialization by the firmware or it could be created during manufacturing of the HSM device 300 for example.

The partition is created having a size which is selected based on a selected memory group size S. The memory group size S is selected such that a read of a memory group does not cause adjacent memory groups to be read or partially read. The memory group size is selected based on the operating system block size for the long-term storage component 302, where the operating system block size is the amount of contiguous data that may be read at a time from the long-term storage 302 into the RAM 309. In this example, the long-term storage component 302 is a Flash-storage device. A page is the smallest portion of Flash memory that can be read. The operating system block size is therefore greater than or equal to the page size of the long-term storage component 302. The operating system block size may be between 512 B and 4096 B for example. In one example, the selected memory group size S is the same as the operating system block size. Alternatively however, if the operating system uses buffering that reads more than one contiguous operating system block at once, the memory group size S is selected to be larger than the operating system block size. The operating system block size for an HSM device 300 can be queried from the operating system, using a command or an API for example. For example, a Linux command can be made to return the operating system block size. Once the filesystem is mounted for the long-term storage component 302, the operating system block size is then fixed.

In some examples, the memory group size S is selected to be equal to the size of the number of operating system blocks that may be read at once, so that unexpected effects from the memory group being misaligned with the operating system blocks do not arise. For example, if the long-term storage device 302, or any other hardware between the long-term storage device 302 and the main memory 309 into which the operating system reads the data, may read more than the operating system blocks size into some intermediate memory buffer that suffers from remanence issues, then the memory group size S should be increased to the size of the contiguous data that may be read into the intermediate memory buffer at once.

In some other examples, the memory group size S is selected to be larger than the size of the number of operating system blocks that may be read at once.

The memory group size S is selected, where S is the number of bytes selected as the memory group size as described above. For example, S may be selected as the operating system block size. The partition size is then selected to be greater than or equal to B+1 memory groups, so that there is one group per value to store the sequence Order_2, and at least one additional group for storing any OTPs and Order_1. In this example, B=256, and therefore the partition is 257×S bytes. For example, S may be between around 512 bytes and 4096 bytes. The partition may be made larger than B+1 memory blocks, to allow for the possibility that some portions of the partition become unusable, for example they can no longer be reliably be read from, if this is an issue that can affect the long-term storage component 302.

In this step S200, a memory partition P is created on the long-term storage component 302. The partition can then be handled independently of the default filesystem which manages memory in the long-term storage component 302. The memory within the partition is managed by the HSM firmware, implementing the methods as described below. The HSM firmware writes data directly to the partition P, without use of a separate filesystem. The firmware reads and writes data from and to the partition, treating it as a raw device. The HSM firmware therefore includes functionality for memory management, including for writing and reading data to the partition P. In particular, the firmware may include a table which indexes portions of the partition, for example the memory groups or locations within the memory groups. In some examples, the partition stores information identifying a partition format version, which allows the firmware to identify which implementation of a memory management scheme in the firmware to use.

In S201, an optional step is performed, in which any first-use mitigations for remanence that are appropriate for the long-term storage component 302 are performed, to make recovery of subsequently stored data more difficult. In this example, in which the long-term storage component 302 is a flash storage device, all memory cells in the partition are overwritten repeatedly with random data in S201. Overwriting the memory cells repeatedly creates cells with more uniform properties, such that it is harder to differentiate between cells. Overwriting all blocks in the partition with X rounds of different data, for example random data generated by the random number generator 301, mitigates remanence effects from use of fresh memory cells. For example, around X=10 to 100 rounds, or even X=1000 rounds, could be performed to repeatedly overwrite the partition with random data. Although in this example the step S201 is described as being applied to the partition, alternatively, the process of S201 may be applied to the whole long-term storage component 302, either before or after the partition is created.

The above steps S200 and S201 are performed the first time that the long-term storage component 302 is used. For example, these steps may be performed during manufacturing, or they might be a one-time operation performed on first boot of the HSM 300. For flash storage, it may be possible to differentiate between freshly programmed, repeatedly-programmed, and newly erased cells. Therefore, S201 is performed the first time that the storage component 302 is used. This provides additional protection of root keys in long-term storage 302 by mitigating against Flash remanence attacks.

The below steps are performed when secret material (in this example the third sequence Order_3) is to be stored in the partition of the long-term storage component 302. This might be immediately after the steps S200 and S201 the first time the HSM 300 is used. This might be after the HSM device 300 has been reset to a factory state, for example when the previous secret material has been erased. The steps S200 and S201 are not performed each time the HSM device 300 is reset to the factory state.

Optionally, each time a factory reset occurs, any remanence-resistant erase operation on the in-use groups of the partition that is appropriate for the long-term storage component 302 in question are performed. For example, for Flash storage, all data in the partition is overwritten with cycles of arbitrary data. For example, the contents of the partition are overwritten with zeros, followed by ones, followed by HSM-generated random data, followed by ones, followed by zeros. This reduces detectable effects of residual charge. As explained above, the partition can be managed independently of the default filesystem which manages memory in the long-term storage component 302. A default filesystem may not securely erase the content when files are erased. In some cases, a default filesystem may not even zeroize the data when files are erased. A default filesystem may simply treat memory as portions of storage space indexed in a table, where portions that have become free after erasing a file may or may not get reused and overwritten in future; in the meantime, the original data remains in the memory. By creating a partition, the memory within the partition can be managed independently of the filesystem, and in particular a remanence-resistant erase operation can be performed on the partition at factory reset.

In S202, a first set of one or more encryption sequences are obtained, including the first encryption sequence, the 'one-time-pad' OTP_1. These are generated using the RNG 301 into the main memory 309 of the HSM device 300, and then written to the long-term storage 302. A hardware RNG may be used to generate the encryption sequence.

The first set of one or more encryption sequences is written into the first group of memory cells 102:1 of the partition. Each memory group 102 is a contiguous volume of memory, for example, each group 102 is a contiguous set of memory cells. For example, in a Flash memory device, each group 102 may comprise a page or an integer number of pages. The first encryption sequence OTP_1 comprises random data of length B bytes. The data is generated by the random number generator 301. In this step, S-256 bytes of HSM-generated random data is written to the start of the first group 102:1. This data is used as N=(S−256)/256 one-time-pads (OTPs) in the below steps. Depending on the memory group size S. N may be between 1 and 15 for example. The one-time-pads are designated as OTP_1, . . . , OTP_N.

In S204, a second sequence Order_2 is obtained. In this step, a random ordering of the integers 0 to 255 (inclusive) is generated, represented as a sequence of 256 bytes. Each value 0 to 255 appears exactly once in the sequence. The ordering is generated using HSM-generated random data in other words using the random number generator 301. The sequence is generated into main memory 309 of the HSM device 300. The sequence may be generated into a portion of main memory 309 which is allocated for use storing various elements associated with the methods described herein. For example, as will be described in more detail below, a portion of main memory 309 is allocated and used to store the second sequence Order_2. The allocated portion of main memory 309 is then used to store the intermediate elements described in relation to the method of FIG. 4, which overwrite the same portion of main memory 309. Alternatively, the second sequence is generated into the CPU registers only in this step, and is not stored in the main memory 309 of the HSM device 300.

In S206, each value of the second sequence Order_2 is written in the groups 102:2 to 102:(B+1) of the partition P. One value is stored per group in the long-term storage 302. Each value is stored at an offset L within each group. In this way, when each group is read into the main memory 309 as described in relation to FIG. 4, the value of Order_2 is in the same position each time, and thus no information is available as to the order in which the groups are read. The value L is selected such that $0<=L<S$. All other memory cells in each group are written with a constant value, e.g. zeros. When each group is read into main memory 309, no information is available that would allow a malicious party to correlate the other data in the groups to the order in which the groups were read. For each byte in the second sequence Order_2, the contents of the next group in the partition of the long-term storage component 302 are written as all zero bytes except for the byte at offset L which is written as the current byte in Order_2.

The group size S is selected such that a read of a group shall not cause adjacent groups to be read or partially read. When each group is read one at a time in this manner, each value of Order_2 is read only one value at a time. The information from the previous group can be overwritten in the main memory 309 each time, meaning that only one plaintext value of Order_2 is stored in main memory 309 at any one time in the method of FIG. 4. The group size S is selected to account for the amount of memory that the operating system will access in one read operation.

In S208, an encrypted version of a first sequence Order_1 is generated and stored in long term storage 302. In this example, the first set of encryption sequences are obtained (in S202) before the encrypted first sequence Order_1 is generated in S208. The allocated portion of main memory 309 is then initialised with a copy of the first encryption sequence OTP_1, the values of which are then XORed in place with each of the other encryption sequences in the first set, and finally with the first sequence Order_1, thereby avoiding the plaintext of the first sequence Order_1 being stored in the main memory 309. The final computed values are then written to long term storage 302. XOR operations with each successive encryption sequence in the first set are performed to more securely encrypt the first sequence Order_1.

The first sequence Order_1 comprises a random ordering of the integers 0 to 255 (inclusive), each represented as a sequence of 256 bytes. Each value 0 to 255 appears exactly once in the sequence. The ordering is generated using HSM-generated random data, in other words using the random number generator 301. The first sequence is XORed with the encryption sequence into main memory 309 of the HSM device 300. The encrypted first sequence is generated into the allocated portion of main memory 309 as described above. The encrypted first sequence is then written into long term memory 302. Alternatively, the encrypted first sequence is generated into the CPU registers only in this step, and is not stored in the main memory 309 of the HSM device 300.

In S208, an encrypted version of the first sequence Order_1 is generated in main memory 309 and then written into long term storage 302. The first sequence is encrypted using the first set of one or more encryption sequences. In this example, the encryption is based on an XOR operation with the encryption sequence, however a different encryption algorithm based on the OTP(s) or another suitable cryptographic technique may be used to encrypt Order_1.

In step S208, the 256-byte value Order_1 XOR OTP_1 . . . XOR OTP_N, i.e. the first sequence Order_1 encrypted multiply with each one-time-pad in the first set of encryption sequences, is written to the remaining space in the first group 102:1 in the partition. This is also referred to as the first encrypted version of the first sequence Order_1.

In S204 to S208, an encrypted first sequence Order_1 and a second sequence Order_2 are obtained, which uniquely define a third sequence Order_3, where Order_3 is the secret material. Order_3 can be determined by some unique combination of Order_1 and Order_2. In this example, the third sequence Order_3 is the resulting ordering of the bytes 0 to 255 (inclusive) that arises from reading the bytes at offset L in each group in the order of Order_1. Order_3 is the secret material used for deriving the root key.

In the above-described method, the secret material Order_3 is stored in the long-term storage component 302 in two parts (the first sequence Order_1 and the second sequence Order_2). Thus even if a malicious third party is able to recover some data from the long-term storage component 302 after erasure (for example after an active tamper mechanism is performed, or after disposal of the HSM), the ability of the attacker to recover the secret material Order_3 is reduced. In this example, Order_3 comprises 256 different values in a random order (determined by Order_1), which means the number of possible sequences for the third sequence Order_3 is 256! (256 factorial), which represents nearly a 1684-bit security level ($\log_2 (256!) \approx 1683.986$). A 1684-bit security level means that an attacker would need to perform $2^{1684}$ operations to decrypt the third sequence. 222 bytes of the third sequence Order_3 could therefore be recovered whilst still retaining nearly 128-bit security (256−222=34, and $\log_2 (34!) \approx 127.795$).

In the above-described example, the first and second sequences each comprise B integer values, being all positive integer values from '0' to 'B−1' inclusive, in a random order. However, various other data used to generate secret material may be stored, such that two or more sequences which can be combined to form the secret material are stored in the long-term storage component 302. The scheme of encryption using the orderings of the sequence values supports protection of secret material when it is loaded into main memory 309. Using the first sequence Order_1 to derive the secret material Order_3 supports protection of the secret material when it is loaded into main memory 309, by providing protection against remanence in the main memory 309.

In the above-described method, the secret material Order_3 is stored in the long-term storage component 302 in two parts (the first sequence Order_1 and the second sequence Order_2), with one of the parts being stored in an encrypted manner. Alternatively however, the secret material Order_3 is stored in the long-term storage component 302 in two parts (for example the first sequence Order_1 and the second sequence Order_2), but with both parts being stored in plaintext. By storing the first sequence Order_1 in an encrypted manner, even if a malicious third party is able to recover some data from the long-term storage component 302 after erasure (for example after an active tamper mechanism is performed, or after disposal of the HSM), the ability of the attacker to recover the secret material Order_3 is reduced. In this example, for a memory group size of 1024 B and using 256 B one-time-pads for encryption, a 128-bit security level can be retained at around a 96.5% data recovery rate for each of the four 256 B elements within the memory group based on Order_1 retrieval, and before even counting any further data loss in the storage of Order_2 ($(0.965^4) \times 256) \approx 221.998$, i.e. leaving enough bytes to achieve nearly 128-bit security). The data recovery rate here refers to the amount of the original data on the long-term storage component 302 prior to erasure that an attacker is predicted to be able to recover.

Using a higher number of encryption sequences in the first set can help achieve a higher target level of security at a given data recovery rate. If there is not enough room in the first group 102:1, additional groups of encryptions sequences can optionally be used to encrypt the first sequence Order_1, in order to achieve a target level of security at a given data recovery rate. Provided that enough storage is available on the long-term storage component 302, and that data recovery is not predicted to be perfect, an acceptable level of security for secret material can be achieved by simply encrypting the first sequence Order_1 multiply with sufficiently many OTPs.

Alternatively, rather than encryption with a first set of one or more OTPs, HSM-generated random data may be stored and used directly as the input for deriving a key to encrypt the first sequence Order_1 using a key derivation algorithm. The length of random data stored may be chosen to ensure that a desired security strength is achieved in the face of a given data recovery rate. Other methods of encryption of the first sequence Order_1 could alternatively be used.

The scheme of encryption with a first set of one or more OTPs is described above in conjunction with the approach of using the two parts (the first sequence Order_1 and the second sequence Order_2), with the orderings of the sequence values which support protection of secret material. However, the scheme of encryption with a first set of one or more OTPs could also be used stand-alone to encrypt secret material of any other form, such as a cryptographic key or seed material used as input for deriving a key using a key derivation algorithm, for example to achieve a desired security level in the face of a given data recovery rate. Other methods of encryption could also be used.

For example, secret material could be encrypted using a number of OTPs having sufficient entropy or a cryptographic key derived to achieve a desired security level, for a projected maximum recovery rate from erased long-term storage. For example, a maximum recovery rate of data erased from the storage component may be determined. Where repeated encryption with OTPs is used, the number of OTPs can be selected as follows. Let the recovery rate of erased data be expressed as a fraction R. In this example, R is 0.965, for a relatively high 96.5% recovery rate. The number of bytes in a 256-byte ordering that can be recovered from N rounds of OTP encryption is $B=(1-R^N)*256$. N is then increased until B! (B factorial) achieves the desired security strength, e.g. B must be approximately 34 in order to achieve approximately 128-bit strength, which requires N to be at least 4 (where $\log_2 (34!) \approx 127.795$). Thus four 256 B one-time-pads are generated, and the 256 B of data is XORed with each one-time-pad in turn. The encrypted data is then stored. By this means, even with relatively high recoverability of erased data, encryption with additional OTPs can still allow a desired security strength to be achieved. The OTP encryption approach allows for simple decryption into main memory, and a reduction in complexity in avoiding remanence issues with intermediate values which occurs when encrypting with a standard cipher such as AES.

Using a standard cipher such as AES rather than multiple OTPs, the desired security level could be achieved more directly by simply storing enough random key data such that the effective key size will still be at the required strength even after the recovery of whatever proportion of that data is possible for that storage type. The encryption key to use with the cipher can be derived from the random key data using a standard key derivation algorithm to obtain a key of an appropriate size for the cipher. For example, if R is the recovery rate of erased data, and L is the key size in bytes that is desired for the cipher, then $L/(1-R)$ bytes of random data may be stored in order to achieve the desired security strength.

If there is uncertainty of what the attacker's recovery rate R of erased data may be, then additional rounds of OTP encryption or larger amounts of key data to use for derivation of a key for a cipher may be used to leave greater margin for safety. These and related approaches for mitigating recoverability of key data from erased long-term storage could be used in isolation from the rest of the scheme if mitigation of remanence in main-memory were not required.

In the above-described method, the second sequence is stored across the multiple memory groups. The memory group size is selected to be greater than or equal to the size of the number of operating system blocks that may be read at once. This also provides protection against remanence when the operating system reads the second sequence into RAM 309. Due to the storage of the second sequence across multiple groups, the second sequence is read into the RAM 309 in multiple steps, overwriting the same portion of RAM 309 each time, which mitigates any useful information about the order being retrievable due to remanence effects in the RAM 309. In cases where a single byte of long-term memory 302 can be read at a time by the operating system and by any hardware between the long-term storage 302 and the main memory 309, without reading any adjacent data into any buffer, then the memory group size S can be 1 byte. However, where the operating system reads more than 1 byte at a time, and potentially the long-term storage 302 may have its own cache of some kind, the group size is increased to mitigate an effect where over-reads leak ordering information into RAM 309.

In the above-described method, one value of Order_2 is stored in each memory group. However, it will be appreciated that in alternative methods, multiple values of Order_2 are stored in each memory group. For example, the values of Order_2 may be stored in pairs or triplets. The values of Order_2 are stored across multiple memory groups, so that all of the values are not contained in a single memory group.

In the above-described example, the group size S is larger than the number of values in the first sequence. However, if the group size S is smaller than the number of values in Order_1, such that that there is not room for storage of the encrypted Order_1 value in one group, then the first set of encryption sequences and the first sequence Order_1 are written across multiple groups, and the partition size is selected accordingly.

In some examples, adjustments to the above-described method are made to allow for avoidance of 'bad' blocks, which can occur on a storage device such as Flash storage, when choosing where to store the blocks in the partition. A bad block may be one which can still be written to, but which no longer reliably stores the desired value and thus cannot be reliably read.

As has been described above, a root key is loaded from the long-term storage component 302 to the RAM 309 for use in cryptographic operations such as encrypting or decrypting an application key. The root key may be loaded from the long-term storage component 302 to the RAM 309 each time the HSM 300 is booted, i.e. powered on, or each time a request from a client to perform a function is received for example.

Once loaded, the root key (in this example the third sequence Order_3 or a key derived from the third sequence) can then be used to decrypt an application key for example. Remanence issues may also arise with the main memory 309. The secret material may be transferred from long-term storage 302 to main memory 309, according to the method described below, in order to provide protection of the secret material when transferred to the main memory 309. The method provides protection of secret material which is transferred from long-term storage 302 (for example persistent Flash memory) to computer main memory 309 (such as DRAM), where the main memory 309 may have remanence issues.

Figure 4:
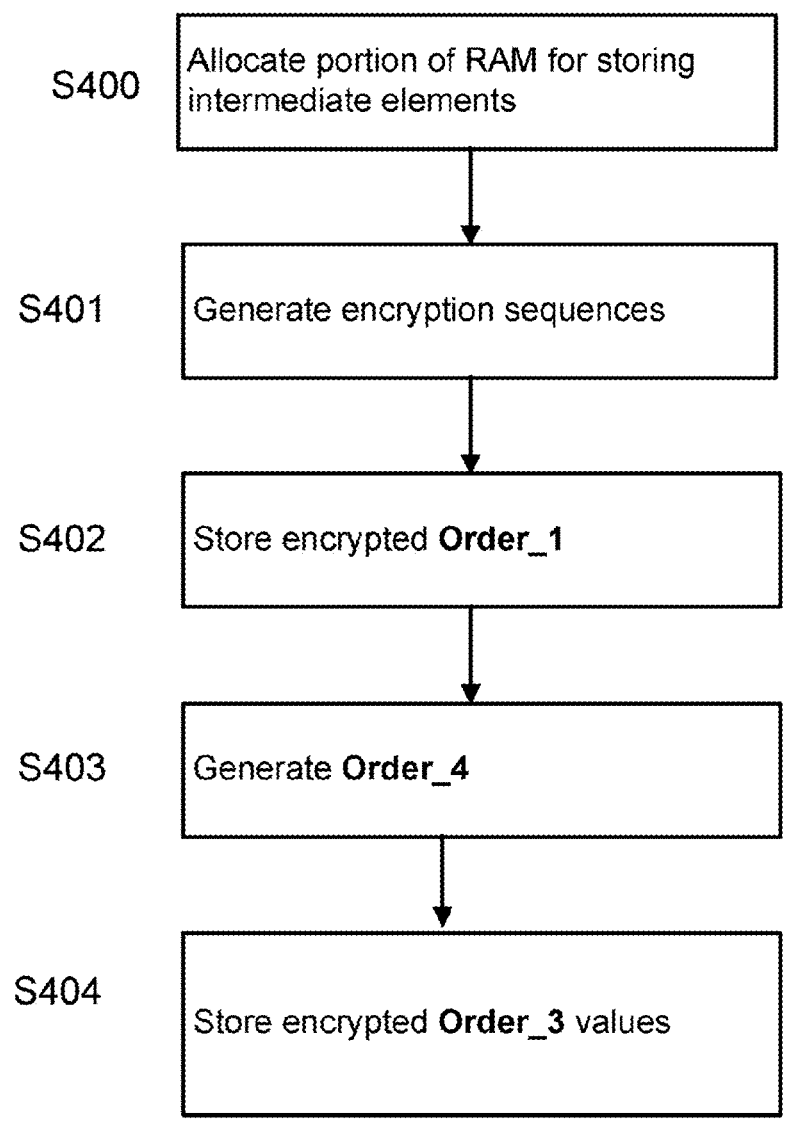
FIG. 4 is a flowchart showing a method of loading data from a long-term storage component to main memory according to an embodiment.

FIG. 4 shows a flowchart illustrating a method according to an embodiment. In this method, secret material is loaded from long-term storage 302 to main memory 309. In this example, the method is described as implemented on the HSM device 300 illustrated in FIG. 3. However, it will be appreciated that the method may be implemented on other devices. The long-term storage 302 is an example of a second storage component and the main memory 309 is an example of a first storage component. The method can be implemented on the HSM 300 to mitigate security weaknesses resulting from any hardware remanence in RAM 309, without making hardware modifications to the HSM device 300.

In S400, a portion of the main memory 309 is allocated for storing intermediate elements which will be used in the remainder of the method of FIG. 4. This may be the same portion of main memory 309 which was allocated and used for storing the second sequence Order_2 and the encrypted first sequence Order_1 in the method described in relation to FIG. 3 above. An operating system command, such as a malloc( ) command may be used to allocate the memory portion of the desired size. The portion allocated in S400 may be larger than the portion allocated and used for storing the second sequence Order_2 and the encrypted first sequence Order_1 in the method described in relation to FIG. 3 above, but include this portion. A portion of main memory 309 of size at least S+3B is allocated for the intermediate elements, where B is a number of bytes. In this example, B=256 bytes. The intermediate elements are OTP_M1, OTP_M3, and Order_4, which will be described in more detail below. Each intermediate element is stored using 256 bytes. This area of main memory 309 may be reused for a different purpose once the method of FIG. 4 is complete. For example, it may be used to store the rolling one-time-pad in S600 of the method described in relation to FIG. 6 below. By re-using the same portion of main memory for various operations, this portion is overwritten and thus data is not stored for an extended period.

In S401, intermediate elements OTP_M1 and OTP_M3 are obtained and stored in the area of main memory 309 allocated in S400. The intermediate elements OTP_M1 and OTP_M3 are also referred to here as encryption sequences. In this step, a first one-time-pad of length B bytes is generated and stored as element OTP_M3. Element OTP_M3 comprises random data of length B bytes. The random data may be generated by the random number generator 301. The element OTP_M3 is for use encrypting the value of Order_3, as will be described in detail below. A second one-time-pad of length B bytes is generated and stored as element OTP_M1. Element OTP_M1 comprises random data of length B bytes. The random data may be generated by the random number generator 301. The element OTP_M1 is for use encrypting the value of Order_1, as will be described in detail below.

In S402, the first encrypted version of Order_1 is read from the long-term storage 302, and the first sequence Order_1 encrypted with OTP_M1 is computed, and stored in the main memory 302. The first sequence Order_1 encrypted with OTP_M1 is also referred to as the second encrypted version of the first sequence Order_1. As has been described previously, the first group of the partition P in the long-term storage 302 stores Order_1 encrypted multiply with each of a set of N one-time-pads {OTP_1, . . . , OTP_N}. This is referred to as the first encrypted version of Order_1. The first group of the partition P of long-term storage 302 is read, and Order_1 encrypted with OTP_M1 is computed and stored in main memory 309.

The sequence of values resulting from the computation Order_1 XOR OTP_1 . . . . XOR OTP_N stored in the first group of the partition P of long-term memory 302 is referred to here as sequence A. The computation of Order_1 encrypted with OTP_M1 is performed by sequencing the XOR calculations such that the plaintext of Order_1 is not stored in main memory 309 during the process. For example, as a first step, a copy of OTP_M1 is stored in the main memory 309 location allocated for Order_1. The XOR operations are then performed in place with each of the 256 values of the sequence A in turn. The value of each bit of Order_1 XOR OTP_M1 is computed as: OTP_1 XOR A XOR OTP_M1. In this computation, only the elements OTP_1, sequence A and OTP_M1 are stored in main memory 302. The plaintext of Order_1 is not stored in main memory 309. This may protect against a timed remanence attack in which a malicious user attempts to recover secret material before it is encrypted.

In S403, a further intermediate element, Order_4, is generated and stored in the allocated portion of main memory 309. Order_4 is a random ordering of the integers between 0 and 255 inclusive. Order_4 may be generated using the random number generator 301. Each value in Order_4 is stored in one byte. The sequence Order_4 is a further random order generated by the firmware each time the root key is read from storage.

Figure 5:
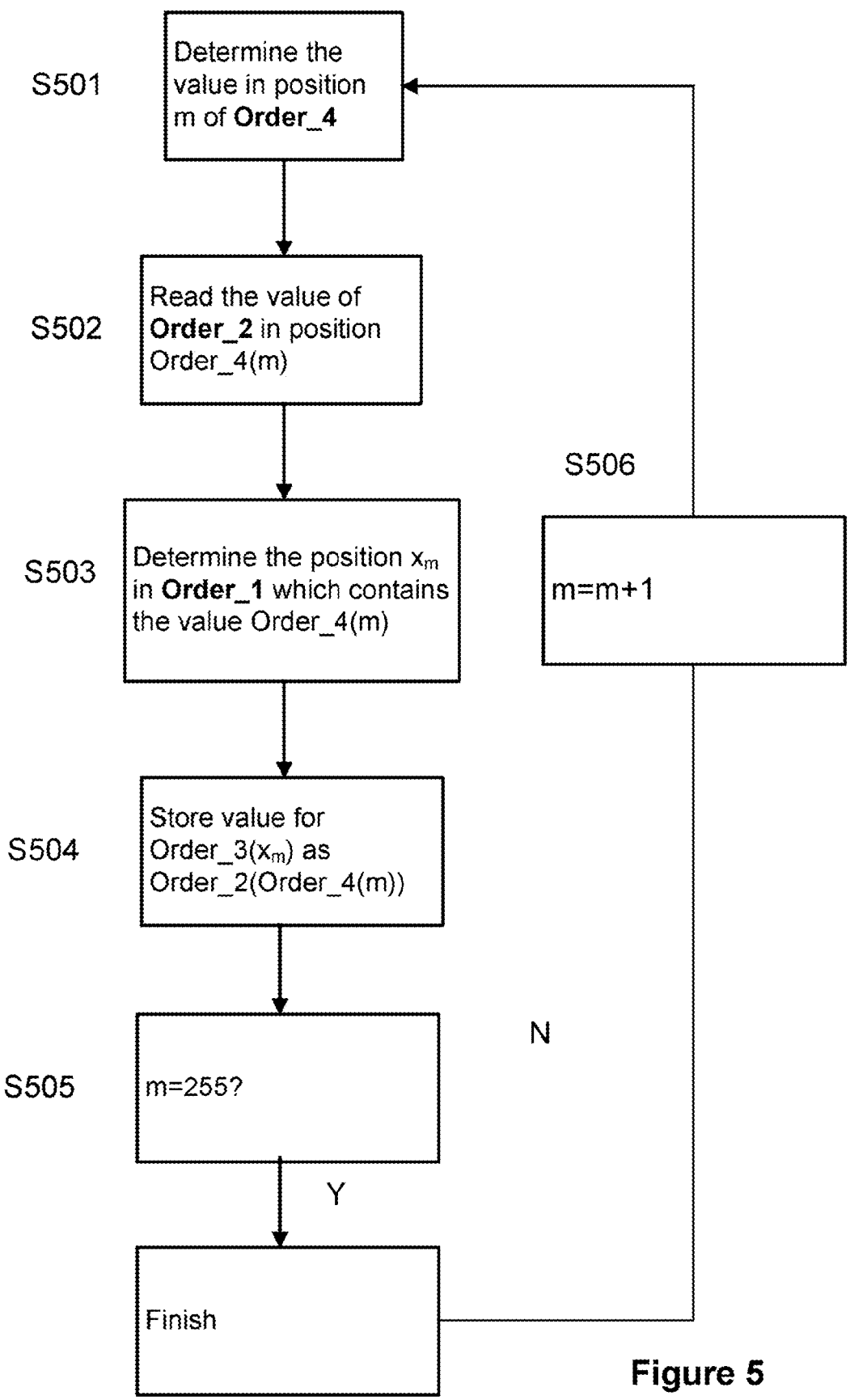
FIG. 5 is a flowchart showing part of a method of loading data from a long-term storage component to main memory according to an embodiment.

In S404, the encrypted Order_3 values are computed and stored, by performing the method described in relation to FIG. 5 below. In this method, the steps S501 to S507 are repeated, where an index m increases by 1 with each iteration. The index m is initialised at 0 and the method stops when m=(B−1), where in this example B=256. Each value of Order_2 is read from long-term storage 302 into main memory 309, with one value being read in each iteration.

In S501, the value in position m of Order_4 is determined. This value is referred to as Order_4(m), and corresponds to the value between 0 and 255 which is stored in the $m^{th}$ position in the sequence Order_4. In the zeroth iteration, where the index m=0, the value in position 0 of Order_4 is determined, where this value is referred to as Order_4(0). For the purposes of this illustrative example, it will be taken that the value 32 is stored in the $0^{th}$ position of Order_4, so that Order_4(0)=32.

In S502, the value in position Order_4(m) of Order_2 is then read into the main memory 309. This value is referred to as Order_2 (Order_4(m)), and corresponds to the value between 0 and 255 which is stored in the Order_4(m)$^{th}$ position of Order_2. In the illustrative example where Order_4(0)=32, then Order_2 (Order_4(0)), or Order_2 (32), is the value between 0 and 255 which is stored in the $32^{nd}$ position of Order_2. For this illustrative example, this value is taken to be 120. By reading the values of Order_2 in the order of the sequence Order_4, remanence in any intermediate buffers in which data is stored when loading from long term storage 302 to main memory 309 is also mitigated.

The value of Order_2 (Order_4(m)) is stored in a designated location of the main memory 309, overwriting the value written in the location during S502 in the previous iteration. The previous group data is thus overwritten in main memory 309 in each iteration. In this step S502, each remaining group 102 of the partition P is read in the order of Order_4, with one group being read each iteration.

In S503 it is determined which position of Order_1 comprises the value Order_4(m). In other words, Order_1 is searched to find the value Order_4(m), and the position in Order_1 where this value is found is returned. We will refer to this position as $x_m$. In the illustrative example, where Order_4(0)=32, Order_1 stores the value 32 in the 17th position, so $x_0$=17 is returned in this step.

In S504, the value of Order_2 (Order_4(m)) is then stored in encrypted form in the $x_m^{th}$ position of Order_3 in the main memory 309, so that Order_3 ($x_m$)=Order_2 (Order_4(m)). The corresponding byte of Order_3 encrypted with the relevant portion of OTP_M3 is therefore computed each iteration. In the illustrative example given, an encrypted form of the value 120 is stored in the position 17 of Order_3.

Again, during this computation, no plaintext of Order_3 is stored in main memory 309. For example, the memory storage for Order_3 is initialised with a copy of OTP_M3. A process of XORing in place the byte at the relevant offset indicated by Order_1 with the value read from the current block of long-term storage 302 is then performed. This may protect against a timed remanence attack in which a malicious user attempts to recover secret material before it is encrypted. In this step, an encrypted version of Order_3 is computed, where Order_3 corresponds to a unique combination of Order_1 and Order_2.

In S505, it is determined if m=255. If m=255, the method finishes. If not, the index is increased in S506, and the process returns to S501 and repeats.

Once the method is finished, the encrypted Order_3 sequence can be stored directly in an object store of the main memory 309. For example, it may be stored as per the object store scheme described below in relation to FIG. 6. Alternatively, the Order_3 sequence is used to derive one or more root encryption keys using a key derivation algorithm. The root encryption keys may be retained in encrypted form in the object store, whereas the encrypted value of Order_3 is deleted from the object store. The Order_3 sequence can be managed in a similar manner to the method described below in relation to FIG. 6 until the one or more root encryption keys are derived.

In the above-described example, the length of the sequences is 256 values, where each value is stored using 1 byte (8 bits) and is a value between 0 and 255. However, sequences of a different length may be used. In a general case, sequences of length B are used. For example, where a sequence having a longer length is used, a plurality of bytes is used to store each value of the sequence.

In the above-described method, the values of Order_2 are read one at a time. One block from long term storage 302 is read into the main memory 309 each iteration. The information from the previous block is overwritten in the main memory 309 each iteration. Each plaintext value of Order_2 is initially read into the main memory 309 one at a time, overwriting the previous value in the same location. Each value is used to compute an encrypted value of Order_3, which is saved in a separate location in main memory 309. Only one plaintext value of Order_2 is stored in main memory 309 at any one time. Since only one value at a time is read, no information about Order_2 leaks into the main memory 309. This provides protection of root keys as they are transferred from long-term storage 302 to main memory 309, for example where the main memory 309 is DRAM and may have remanence issues.

Reading values of Order_2 one at a time provides the greatest reduction in security risk. However, it will be appreciated that in alternative methods, multiple values of Order_2 are read at a time. For example, the values of Order_2 may be read into main memory 309 in pairs or triplets. This may occur where multiple values are stored in each memory group, or where the group size is selected to be smaller than the block size of the operating system for example. Reading more than one value in each step means that the security risk is higher than that obtainable by reading one value in each step. However, the values of Order_2 are still read in multiple steps (for example 3 values per step), meaning that the plaintext of the entire Order_2 sequence is not stored in main memory 309 at any point during the method. A security risk resulting from an attack exploiting remanence of the RAM 309 is therefore still reduced.

In the above-described methods, the blocks are read in arbitrary order, namely the order of Order_4. The blocks contain all possible values 0 to 255. No distinguishable information about Order_2 therefore remains in main memory 309. Any remanence in the main memory 309 yields at most that Order_2 comprises 256 bytes of the values 0 through 255 in some order, which is information already given in the algorithm and not unique to the particular instance.

Although reading the blocks in arbitrary order provides a further reduction in security risk, it will be appreciated that in alternative methods, the blocks may be read in a different order, for example in the order that Order_2 is present in the long-term storage. Since the values of Order_2 are still read in multiple steps, the plaintext of the entire Order_2 sequence is not stored in main memory 309 at any point during the method. A security risk resulting from an attack exploiting remanence of the RAM 309 is therefore still reduced.

In the above-described method, the Order_1 sequence is stored as an encrypted version in the main memory 309. In the method described, the Order_1 sequence is encrypted by an XOR operation of the Order_1 sequence with a one-time-pad OTP_M1. However, it will be appreciated that alternative methods of storing the Order_1 sequence in an encrypted manner may be used.

In the above-described method, the computation of the second encrypted version of Order_1 for storage in main memory 309 from the first encrypted version of Order_1 stored in long term storage 302 is performed such that the plaintext of Order_1 is not stored in main memory 309. Although this provides a further reduction in security risk, it will be appreciated that in alternative methods, the plaintext Order_1 is calculated from the first encrypted version of Order_1 stored in long term storage 302, and the second encrypted version of Order_1 for storage in main memory 309 is computed from the plaintext Order_1. Since the values of Order_2 are still read in multiple steps, the plaintext of the entire Order_2 sequence is not stored in main memory 309 at any point during the method. A security risk resulting from an attack exploiting remanence of the RAM 309 is therefore still reduced.

Although storing the Order_1 sequence as an encrypted version in the main memory 302 provides a further reduction in security risk it will be appreciated that in alternative methods, the Order_1 sequence may be stored as plaintext in the main memory 302. Since the values of Order_2 are still read in multiple steps, the plaintext of the entire Order_2 sequence is not stored in main memory 309 at any point during the method. A security risk resulting from an attack exploiting remanence of the RAM 309 is therefore still reduced.

In particular, even if information about Order_1 leaked into main memory 302, for example into buffers not directly under control of the algorithm, without knowledge of Order_2, Order_3 cannot be computed. The plaintext of the entire Order_2 sequence is not stored in main memory 309 at any point during the method.

Further optional additions to the algorithm are possible to further improve mitigation of remanence effects. For example, particular details of how the groups are read may be adjusted to help reduce leakage due to implementation details in the system, including both hardware and software implementation details. For example, it would be possible to remount the partition P after reading each group, so that ordered information does not appear in buffers created by the Operating System.

As mentioned above, RAM 309 can also be susceptible to remanence, particularly where data is stored for a prolonged time in RAM 309, for example longer than 10 minutes. The below method mitigates against RAM remanence issues and provides improved protection of secret material which is loaded into main memory 309. In particular, the method addresses remanence issues, and also provides some mitigation against other memory attacks. The method provides protection of secret keys whilst they are loaded in main memory 309, such as DRAM, to address remanence issues.

Figure 6:
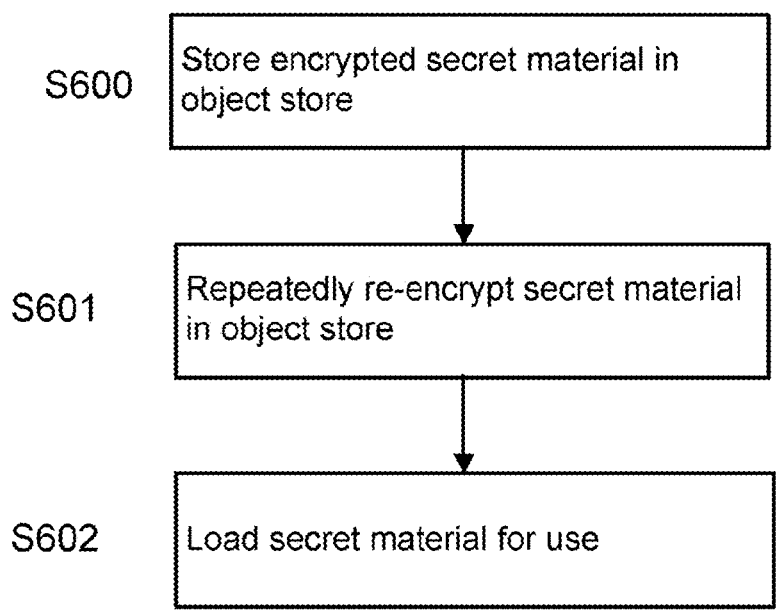
FIG. 6 is a flowchart showing a method of managing data stored in main memory according to an embodiment.

FIG. 6 is a schematic illustration of a method according to an embodiment, in which data stored in the main memory 309 is managed so as to mitigate remanence.

In S600, when secret material is loaded into the RAM 309, it is stored in the object store of the RAM 309. When secret material is loaded into the main memory object store, it is encrypted with a unique offset of a one-time-pad. The secret material in this example is the third sequence Order_3. The one-time-pad is expanded with more random data generated by the random number generator 301 as needed if the size of the object store grows. Optionally, the rolling one-time pad may be generated using a deterministic RNG seeded and periodically re-seeded with entropy from the hardware RNG, for performance efficiency. The rolling one-time pad may be stored in the portion of the main memory 309 allocated for storing the intermediate elements in the method of FIG. 4.

In S601, the secret material is repeatedly re-encrypted at pre-determined time intervals.

In one example, every Y minutes the one-time-pad (OTP) portion for the secret material (the third sequence Order_3 in this example) is rolled over with new random data from the random number generator 301. Optionally, each secret material ciphertext is locked in turn for its portion to be re-encrypted by XOR-ing with the sequence {old key XOR new key} so that the secret material (the third sequence Order_3) is not present in plaintext during this process. A mutex is acquired whilst the ciphertext is re-encrypted, so that no job threads read a corrupted value whilst it is being re-encrypted. The old key referred to here is the previous one-time-pad portion, and the new key is the new one-time-pad portion. Each time secret material (in this example the third sequence Order_3) is loaded from the object store by a job (for example, to be used in an encryption operation), the ciphertext is "locked" so as to avoid concurrent one-time-pad or key rollover. The secret material is then decrypted onto the job's thread stack. When the secret material is unlocked after use, the stack memory used to store the secret material is zeroized for example.

For example, an OTP update thread which maintains an ordered queue of deadlines for each secret material to be rolled over can be used. The process comprises sleeping until the next deadline is reached, performing the roll-over for that secret material, adding the secret material back to the end of the queue with a deadline Y minutes later than the previous deadline, and sleeping until the deadline of the next entry in the queue. A "weak" reference to the secret material may be held, so that if the secret material is deleted from the object store in the interim, that secret material is skipped, and the deadline is not replaced in the queue. The weak reference will not block the erasure of the secret material ciphertext or the reclamation of that portion of main memory 309 for reuse. Only the portion of main memory needed to maintain the weak reference's integrity remains, until the deadline is reached after an object's deletion.

Alternatively, rather than using an OTP to encrypt secret material in main memory 309, a symmetric key or keys could be used along with a symmetric encryption algorithm. This may involve storage of Initialization Vectors in main memory 302 if re-using a symmetric key for encrypting different secret material or any other steps appropriate to the algorithm in question. This approach is more computationally expensive, however potentially requires less additional storage overhead, especially where the scheme uses a single symmetric key and deterministic counter-based Initialization Vectors to minimize per-secret overheads. The OTP approach on the other hand requires less computational resource for encryption and decryption, since only the XOR operation is used for example. The OTP approach may however use at least double the memory needed to store the unencrypted secret material. The portion of main memory 309 used for the intermediate values in the method of FIG. 4 can be reused for storing the changing OTP for the encryption of secret material loaded into main memory 309 for example. Other types of encryption may alternatively be used.

The duration Y may be chosen based on a length of storage time that could, in practice, enable an attacker to recover data from main memory 309 after the device has powered down. For example, if a data storage time of 10 minutes would render the data susceptible to a remanence attack, then Y might be set to 5 minutes in order to allow for a margin of error, and allow time for the roll-over to the new one-time-pad to be processed before the expiry.

By repeatedly re-encrypting secret material at pre-determined time intervals, e.g. every or 10 minutes, information is not stored long enough to leave a recoverable remanence artefact in the RAM 309.

In S602, when the secret material is required for a task (for example to encrypt some data), the secret material is loaded from the object store by a job onto the job's thread stack. In this step, the secret material is decrypted and stored on the job's thread stack. For example, in the case of the one-time-pad encryption method described in S601, the encrypted secret material is XORed in place on the thread stack with the relevant offset of the one-time-pad. Thus the secret material is stored in an encrypted form in the main memory objection store, and decrypted onto a job's thread stack in the main memory 309 when required for a computation. Secret material is stored for only a short time on job thread stacks, meaning a remanence attack is unlikely to be practical.

If the same secret material is repeatedly used by a job however, it may be written repeatedly to the same location. This may increase the risk that the secret material is recoverable through a remanence attack. For this reason, each time a job is executed in S602, a stack memory allocation in the range 0 through Z bytes is used, to vary the location in main memory 309 which is used. In the C programming language, this might be implemented with alloca( ) or with a C99 Variable Length Array. The varying stack offset could be determined using a round-robin based approach. Alternatively, a non-deterministic algorithm could be used, which additionally mitigates against unrelated attacks exploiting uninitialized variable bugs in software, by making any previous stack contents unpredictable. The number of bytes Z within which to vary the location on a job thread stack may be chosen based on predicted attacker capabilities and the size and variability of the data that is being decrypted onto the job thread stack. An example value of Z is 1000 bytes. Stack memory is reclaimed after the processing of the job.

Secret material can be protected further in this step S602 by not decrypting onto the job thread stack in main memory 309, but instead directly into CPU registers. For example, in the case of the one-time-pad encryption method described in S601, the encrypted secret material is read into a CPU register, XORed in place with the relevant offset of the one-time-pad. In this regard, if the secret material is decrypted directly into a CPU register, it is less likely to be exposed in main memory 309. CPU memory changes sufficiently often such that exploiting remanence would be more challenging than for main memory 309 for an attacker.

Alternatively, in some cases it may be possible to perform some computations on the secret material directly whilst it is encrypted, and post-process later.

Additional protections for the object store of the HSM 300 can be applied to mitigate memory attacks arising from software bugs. For example, operations that make main memory 309 locations unreadable and un-writable when not in deliberate use, so that a signal or exception is raised when an unauthorized memory access occurs, for example due to a software bug (such as Heartbleed-type bugs) that might leak information by reading past the end of a buffer. Options such as the PROT_NONE option to mprotect( ) on POSIX systems can be used.

In some examples, the above-disclosed additional protections, such as decrypting into registers only or additional software protections on the object store, are applied to all secret material that is stored in the main memory 309. Alternatively, the above-disclosed additional protections, such as decrypting into registers only or additional software protections on the object store, may be applied to high value secret material only, such as root key encryption keys for example. Additionally or alternatively, the above-disclosed additional protections, such as decrypting into registers only or additional software protections on the object store, may be applied to keys based on frequency of usage, to help balance performance and security.

Figure 7:
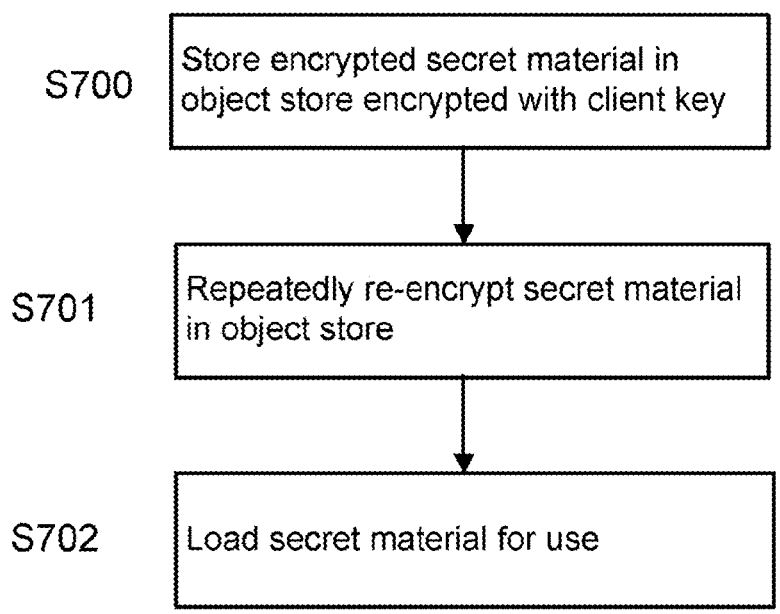
FIG. 7 is a flowchart showing a method of managing data stored in main memory according to an embodiment.

FIG. 7 is a schematic illustration of a method of managing stored data according to an embodiment, in which the secret material is associated with a particular client. Various objects (secret material) in the main memory 309 object store may relate to a particular client. For example secret material that has been generated in the HSM 300 in response to a request by the client, or secret material that has been imported into the HSM 300 by the client. In addition to the measures discussed above, further protection for such secret material may be provided by additionally encrypting the secret material by a further key that is provided by the client. This further key will be referred to here as a client key. For example, the client key could be a symmetric key that is specific to the session, or it could be specific to the secret material in question. Alternatively, in cases where storage and communication overhead is less important than computational simplicity, the client key could be a one-time-pad for each secret.

In S700, the client key is used to encrypt the secret material in the object store, in addition to the object store's own encryption as described in S600 above. The client itself does not encrypt the secret material using the client key, rather the client key is provided to the HSM 300 which uses it to encrypt the secret material in the object store. Furthermore, the secret material may be encrypted by another key that is stored in the HSM 300, as described in S600. In other words, the client key exists for revocation of access to secret material that is loaded in the HSM 300, not for securing communication with the HSM 300 nor for securing encrypted material outside the HSM 300.

The secret material encrypted with the client key is repeatedly re-encrypted with an additional key whilst stored in the object store in S701, in the same manner as described in relation to S601 of FIG. 6 above.

The client key is used to decrypt secret material when loaded into a job thread stack for use in S702. For example, the client resupplies the client key when needed, which might be periodically before a selected timeout when the secret material is still in active use, or with every job submitted to the HSM 300 that needs the secret material.

In the case where the client key is presented periodically, revocation is achieved by the client not sending the client key again and allowing it to time-out. In response, the HSM 300 may then delete its copy of the client key, and would subsequently require the client key to be sent again by the client before the secret material protected by it can be decrypted by the HSM 300. Alternatively, the secret material could simply be deleted from the main memory 309 object store immediately after the timeout.

In the case where the client key is sent with every job using the secret material, the HSM 300 will only store the client key in main memory 309 for long enough to process the job before erasing the client key. In this case the client has control over when the HSM 300 can use the secret material.

Limiting the time during which the HSM 300 can access the secret material without permission from the client can also mitigate attacks on main memory 309 for secret material not routinely in use. This mitigation applies both in the case of attackers attacking the device directly (e.g. to exploit software memory bugs, micro-architectural attacks, row-hammer attacks, or cold boot attacks), and with remote attacks where an attacker attempts to hijack an existing client session. Such a scheme also helps limit the scope of attacks by service providers or other clients, where an HSM 300 is being used by multiple clients in separate security domains that are not mutually trusting.

Although in the above-described method, the client key is used to encrypt secret material that is generated in the HSM 300 in response to a request by the client, or imported into the HSM 300 by the client, a client key could alternatively be used to encrypt root encryption keys for example. The root key encryption keys of the HSM 300 that are stored in long-term storage 302 (or whose seed input is stored in long-term-storage 302) could additionally by encrypted by a client key, or a key provided by an external service running on another device, in the same way as the client keys control access to secret material the client itself has loaded or generated.

Protecting the root key encryption keys of the HSM 300 that are stored in long-term storage 302 (or whose seed input is stored in long-term-storage 309) by splitting the protection between two devices (for example between the HSM 300 and a client device) further mitigates remanence, for example in the case where the HSM 300, which may be in a location not under the client's control such as a cloud provider's data center, is attacked, but the client or other external service is not accessible to the attacker. Additionally, if an authenticated client of the HSM 300 directly or indirectly has use of long-term keys on the HSM 300, the use of an additional client key to protect the long-term keys makes the scope of access of the client cryptographically enforced and not just administratively enforced by the authentication of the client to the HSM 300. A client may indirectly have use of long-term keys if they have the ability to use long-term keys to decrypt other wrapped keys imported into the HSM 300 for example.

Although, in the above-described methods, secret material is stored in a long-term storage component 302 within an HSM device 300, in alternative examples, the long-term storage component may be a storage component external to the HSM device 300, for example a smart card. Contents of a smartcard may be encrypted by a key that is derived at least in part from secret material that is stored in the HSM. Since the contents of the smartcard are encrypted, remanence on the smartcard is less significant, however it is still desirable to prevent presentation of recovered smartcards that had been erased. The above-described method could therefore also be applied to a smartcard in some examples.

As has been described herein, an HSM may implement various mechanisms to protect against physical access enabling direct reading of secret material. For example, an HSM may erase root keys when factory-stated, or when an active tamper mechanism is triggered. A malicious party having physical access to the HSM may exploit remanence in the HSM to retrieve secret material. Various storage component hardware may not have a remanence issue, or may have remanence in a more readily mitigated manner, for example specific hardware may benefit from low-level mitigations, where memory contents are refreshed constantly to avoid remanence. However, for many applications such hardware is unavailable or implementing such low-level mitigations is impractical or computationally expensive. In particular, updating an existing HSM device with modified hardware to mitigate remanence may not be possible in all cases. Various memory-based attacks (besides remanence) may in some cases be mitigated by implementing firmware in a memory-safe language for example. However, re-writing firmware is again not possible in all cases, and performance overheads of memory-safe languages may be unacceptable in many implementations. Start-up protection could in some cases be implemented with "ignition key" hardware tokens that must be inserted at start-up of the HSM device for example. Smartcard protection of application keys has also been described herein. However, once the keys are loaded to the main memory of the HSM, they may be vulnerable to an attack on the HSM by malicious third parties, or service providers and tenants in a multi-tenant scenario.

The above-described methods provide protection against indirect reading of erased secrets by exploiting physical properties of the storage components of the HSM. The above-described methods provide mitigations against remanence-based attacks. The mitigations are implemented in software. The methods may further provide defence-in-depth mitigation against various attacks that attempt to retrieve information from memory, even if complemented with other existing mitigations. The above-described methods further provide protection of secret material, for example root cryptographic keys, in an HSM device, by providing improved resistance to remanence attacks, as well as mitigation of other security attacks by re-encrypting data loaded into main memory. In particular, the methods reduce the recoverability of keys from HSMs, especially after factory reset.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A method of storing data from a second storage component in a first storage component, the method comprising:
 storing information relating to a first sequence of values in the first storage component;
 storing a second sequence of values from the second storage component into the first storage component in a plurality of steps, deleting or overwriting one or more values from the second sequence of values which were stored in the first storage component in a previous step; and
 storing an encrypted third sequence of values in the first storage component, wherein the third sequence of values is derivable from the first sequence of values and the second sequence of values,
 wherein for each of the plurality of steps, a value from the second sequence of values is read from the second storage component into the first storage component according to a random order, and an encrypted version of the value is written to the first storage component in a position of a portion of memory in the first storage component to be used to store the third sequence of values, the position being determined according to the first sequence of values.

2. The method of claim 1, wherein storing information relating to the first sequence of values comprises reading a first encrypted version of the first sequence of values from the second storage component, and writing a second encrypted version of the first sequence of values to the first storage component.

3. The method of claim 1, wherein each step comprises reading a group of memory cells in the second storage component comprising a portion of the second sequence of values.

4. The method of claim 3, wherein the group of memory cells comprises at most one value of the second sequence.

5. The method of claim 1, further comprising:
 prior to storing the encrypted version of the third sequence of values, storing an encryption sequence in a portion of memory to be used to store the encrypted version of the third sequence.

6. The method of claim 1, further comprising repeatedly re-encrypting the third sequence of values with a further encryption sequence at pre-determined time intervals.

7. The method of claim 1, further comprising decrypting the third sequence of values and using the third sequence of values for a cryptographic operation.

8. A device, comprising:
 a first storage component;
 a second storage component; and
 one or more processors, the one or more processors configured to:

store information relating to a first sequence of values in the first storage component;

store a second sequence of values from the second storage component into the first storage component in a plurality of steps, deleting or overwriting one or more values from the second sequence of values which were stored in the first storage component in a previous step; and store an encrypted third sequence of values in the first storage component, wherein the third sequence of values is derivable from the first sequence of values and the second sequence of values, wherein for each of the plurality of steps, a value from the second sequence of values is read from the second storage component into the first storage component according to a random order, and an encrypted version of the value is written to the first storage component in a position of a portion of memory in the first storage component to be used to store the third sequence of values, the position being determined according to the first sequence of values.

9. The device of claim 8, wherein the device is a hardware security module device, the second storage component is a non-volatile storage component of the hardware security module device and the first storage component is a main memory component of the hardware security module device.

10. A non-transitory computer readable storage medium comprising program instructions stored thereon that are executable by a computer processor to perform a method comprising:

storing information relating to a first sequence of values in the first storage component;

storing a second sequence of values from the second storage component into the first storage component in a plurality of steps, deleting or overwriting one or more values from the second sequence of values which were stored in the first storage component in a previous step; and storing an encrypted third sequence of values in the first storage component, wherein the third sequence of values is derivable from the first sequence of values and the second sequence of values, wherein for each of the plurality of steps, a value from the second sequence of values is read from the second storage component into the first storage component according to a random order, and an encrypted version of the value is written to the first storage component in a position of a portion of memory in the first storage component to be used to store the third sequence of values, the position being determined according to the first sequence of values.

* * * * *